(12) United States Patent
Wackwitz et al.

(10) Patent No.: US 8,567,295 B2
(45) Date of Patent: Oct. 29, 2013

(54) BAND SAW BLADE REMOVAL MECHANISM

(75) Inventors: Jeffrey M. Wackwitz, Waukesha, WI (US); Jonathan A. Zick, Waukesha, WI (US); Andrew J. Weber, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 364 days.

(21) Appl. No.: 13/056,754

(22) PCT Filed: Jul. 31, 2009

(86) PCT No.: PCT/US2009/052333
§ 371 (c)(1),
(2), (4) Date: Apr. 28, 2011

(87) PCT Pub. No.: WO2010/014865
PCT Pub. Date: Feb. 4, 2010

(65) Prior Publication Data
US 2011/0197457 A1    Aug. 18, 2011

Related U.S. Application Data

(60) Provisional application No. 61/085,019, filed on Jul. 31, 2008.

(51) Int. Cl.
*B27B 13/00* (2006.01)
*B27B 13/16* (2006.01)

(52) U.S. Cl.
USPC .............................................. 83/788; 30/380

(58) Field of Classification Search
USPC ...................... 30/380; 83/788–820
See application file for complete search history.

(56) References Cited

U.S. PATENT DOCUMENTS

| | | | | |
|---|---|---|---|---|
| 1,468,381 A | * | 9/1923 | Green et al. | 30/380 |
| 1,642,838 A | * | 9/1927 | Causey | 83/820 |
| 3,452,734 A | * | 7/1969 | Cleland et al. | 83/814 |
| 3,491,816 A | * | 1/1970 | Harrison | 83/805 |
| 3,534,647 A | * | 10/1970 | Mills | 83/820 |
| 3,557,848 A | | 1/1971 | Wright | |
| 3,566,731 A | * | 3/1971 | Ensley | 83/799 |
| 3,621,894 A | * | 11/1971 | Niksich | 30/380 |
| 3,829,970 A | | 8/1974 | Anderson | |

(Continued)

FOREIGN PATENT DOCUMENTS

JP          03170221 A  *  7/1991
WO     WO 2010014865 A1 *  2/2010

OTHER PUBLICATIONS

PCT/US2009/052333 International Search Report dated Sep. 9, 2009 (8 pages).

*Primary Examiner* — Jason Daniel Prone
(74) *Attorney, Agent, or Firm* — Michael Best & Friedrich LLP (57) ABSTRACT

A blade removal mechanism is moveable between a first position and a second position for engaging a band saw blade. The blade removal mechanism includes a first member for positioning adjacent a blade-receiving space of the band saw, the first member engageable with the band saw blade when the blade removal mechanism is in the second position. The mechanism also includes an actuator coupled to the first member for transmitting movement to the first member and a biasing member for biasing the actuator and the first member to the first position and away from the band saw blade.

20 Claims, 8 Drawing Sheets

(56) References Cited

U.S. PATENT DOCUMENTS

| | | | | |
|---|---|---|---|---|
| 3,830,131 A | * | 8/1974 | Wells | 83/820 |
| 3,872,762 A | * | 3/1975 | McKillip et al. | 83/820 |
| 3,961,550 A | * | 6/1976 | Oliver et al. | 83/817 |
| 3,993,118 A | | 11/1976 | Moore et al. | |
| 4,001,937 A | * | 1/1977 | Stelljes et al. | 83/818 |
| 4,160,320 A | * | 7/1979 | Wikoff | 83/817 |
| 4,172,402 A | * | 10/1979 | Hayward | 83/817 |
| 4,356,750 A | * | 11/1982 | Legler et al. | 83/816 |
| 4,413,414 A | * | 11/1983 | Strzalka | 83/817 |
| 4,576,139 A | * | 3/1986 | Cogswell | 83/788 |
| 4,597,132 A | * | 7/1986 | Elmer et al. | 83/814 |
| 4,702,137 A | | 10/1987 | Davidson et al. | |
| 4,848,202 A | | 7/1989 | Crampton | |
| 4,854,208 A | | 8/1989 | Aoyagi | |
| 4,901,612 A | * | 2/1990 | Harris | 83/789 |
| 4,953,295 A | * | 9/1990 | Barradas et al. | 83/816 |
| 5,107,738 A | | 4/1992 | Aoyagi | |
| 5,410,934 A | * | 5/1995 | Krippelz | 83/820 |
| H0001867 H | * | 10/2000 | Quiram | 83/779 |
| 6,230,602 B1 | * | 5/2001 | Baker | 83/813 |
| 6,679,149 B2 | | 1/2004 | Yan et al. | |
| 7,000,514 B2 | * | 2/2006 | Gass et al. | 83/793 |
| 7,077,041 B2 | * | 7/2006 | Kunkel et al. | 83/814 |
| 7,210,387 B2 | * | 5/2007 | Liao | 83/816 |
| 7,621,205 B2 | * | 11/2009 | Gass | 83/790 |
| 7,654,184 B2 | * | 2/2010 | Aihara et al. | 83/788 |
| 8,245,616 B2 | * | 8/2012 | Jourdan | 83/820 |
| 8,365,643 B2 | * | 2/2013 | Aihara et al. | 83/813 |
| 8,381,624 B2 | * | 2/2013 | Donovan et al. | 83/818 |
| 8,397,390 B2 | * | 3/2013 | Wilbert | 30/380 |
| 2002/0023527 A1 | * | 2/2002 | Wood | 83/788 |
| 2002/0157510 A1 | * | 10/2002 | Yan et al. | 83/816 |
| 2008/0060207 A1 | | 3/2008 | Liao | |
| 2008/0271327 A1 | * | 11/2008 | Glynn | 30/380 |
| 2010/0018064 A1 | * | 1/2010 | Bertsch et al. | 30/380 |
| 2010/0024225 A1 | | 2/2010 | Wackwitz | 30/380 |
| 2010/0180739 A1 | * | 7/2010 | Gass | 83/788 |
| 2010/0287782 A1 | * | 11/2010 | Bertsch et al. | 30/380 |
| 2011/0119934 A1 | * | 5/2011 | Bertsch et al. | 30/380 |
| 2011/0119935 A1 | * | 5/2011 | Elger et al. | 30/380 |
| 2011/0296696 A1 | * | 12/2011 | Holly et al. | 30/380 |

* cited by examiner

BAND SAW BLADE REMOVAL MECHANISM

RELATED APPLICATIONS

This application claims priority to U.S. Provisional Patent Application Ser. No. 61/085,019 filed on Jul. 31, 2008, the entire contents of which are incorporated herein by reference.

BACKGROUND

The present invention relates to blade mechanisms for a power tool, and more particularly for a band saw. Furthermore, the present invention, in one aspect, is a band saw with a blade installation mechanism and, in another aspect, is a band saw with a blade removal mechanism.

A band saw typically includes a drive wheel pulley, a motor coupled to the drive wheel pulley to drive the drive wheel pulley, a driven wheel pulley, and a continuous band saw blade looped around the drive wheel and the driven wheel. The band saw blade is rotatably mounted about the two wheels to effect a cutting action on a work piece. The tension created by looping the band saw blade about the two wheels provides that the band saw blade will remain in place between the two wheels. Due to the tension in the blade and the arrangement of components around the wheels, it is difficult for a user to insert or install the blade in the band saw and remove the blade from the band saw.

SUMMARY

In one embodiment, the invention provides a blade removal mechanism moveable between a first position and a second position for engaging a band saw blade. The blade removal mechanism includes a first member configured for positioning adjacent a blade-receiving space of the band saw, the first member engageable with the band saw blade when the blade removal mechanism is in the second position. The mechanism also includes an actuator coupled to the first member for transmitting movement to the first member, and a biasing member for biasing the actuator and the first member to the first position and away from the band saw blade.

In another embodiment, the invention provides a band saw including a housing, a motor supported by the housing, a first wheel drivingly connected to the motor, a second wheel rotatably supported by the housing, and a band saw blade to cut a workpiece. The blade extends around the first and second wheels, and the housing defines a blade-receiving space for receiving the blade therein. The band saw also includes a blade removal mechanism coupled to the housing, the blade removal mechanism moveable between a first position and a second position for engaging the blade. The blade removal mechanism includes a first member positioned adjacent the blade-receiving space, the first member engageable with the blade when the blade removal mechanism is in the second position. The blade removal mechanism also including an actuator for transmitting movement to the first member and a biasing member for biasing the first member to the first position and away from the blade.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
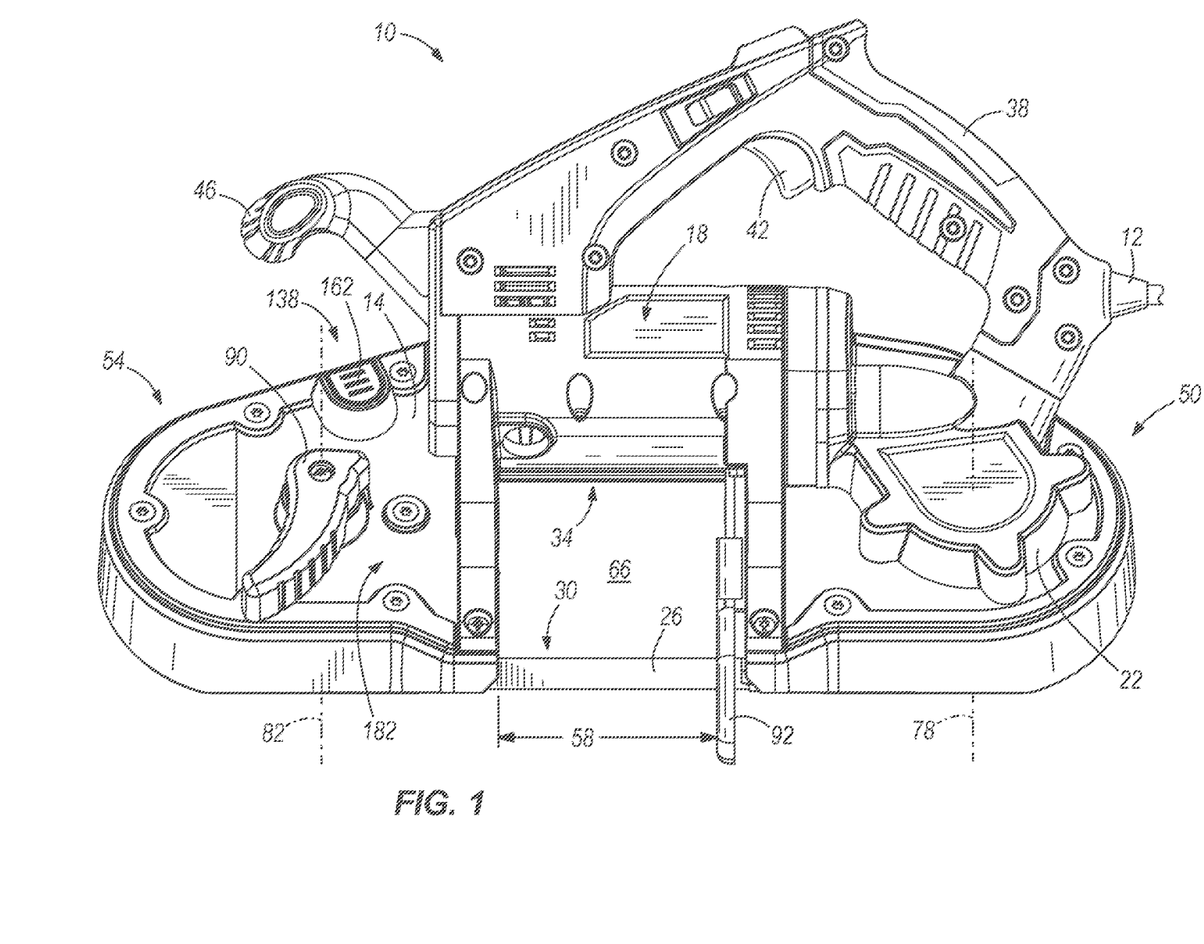
FIG. 1 illustrates a band saw having a blade removal mechanism and a blade installation mechanism.

FIGS. 1-3A and 4-7 illustrate a band saw 10 embodying blade mechanisms according to one embodiment of the invention. FIG. 1 illustrates an AC version of the band saw 10 having an electrical connection cord 12; however in further embodiments, DC versions of the band saw 10 including a rechargeable, removable battery pack are possible.

The band saw 10 includes a housing or frame 14 supporting a motor 18 and a gear box 22. The motor 18 is drivingly connected to a drive mechanism (not shown) at least partially housed within the gear box 22. The motor 18 and the drive mechanism are operable to drive a continuous band saw blade 26 to cut a work piece. As described herein, the band saw 10 includes a front 30 and a rear 34. The front 30 is defined as the side being proximate the portion of the band saw blade 26 that cuts the work piece and the rear 34 is defined as the side proximate the portion of the band saw blade 26 that does not cut the work piece. The rear 34 is otherwise described as being opposite the front 30.

The housing includes a main handle 38 supporting a switch assembly 42 to provide power to the band saw 10. The switch assembly 42 is operable to control operation of the motor 18. The band saw 10 also includes an auxiliary handle 46 for a user's other hand. Generally, the handles 38, 46 are shaped and arranged for two-handed operation of the band saw 10 as the work piece is cut. In the illustrated embodiment, each handle 38, 46 has an ergonomic design to provide comfortable gripping and controlled operation of the band saw. The ergonomic design of each handle 38, 46 and of the combination of the handles may include the orientation or angle of handle(s). The ergonomic design may also include the use of material, such as an elastomeric material, on the handle(s) 38, 46 to, one or more of, provide an improved grip surface, isolate vibration and impacts from the operator, prevent heat build-up and/or transfer to the operator, etc.

The housing 14 defines a first portion 50 and a second portion 54. The first portion 50 and the second portion 54 are spaced apart from one another and define a U-shaped cavity 66 defining a cut zone 58 therebetween. A blade guard 62 (FIG. 2) is positioned at the rear 34 of the band saw 10 and extends between the first and second portions 50, 54 within the cut zone 58. The blade guard 62 provides a recessed area to house the band saw blade 26.

Figure 2:
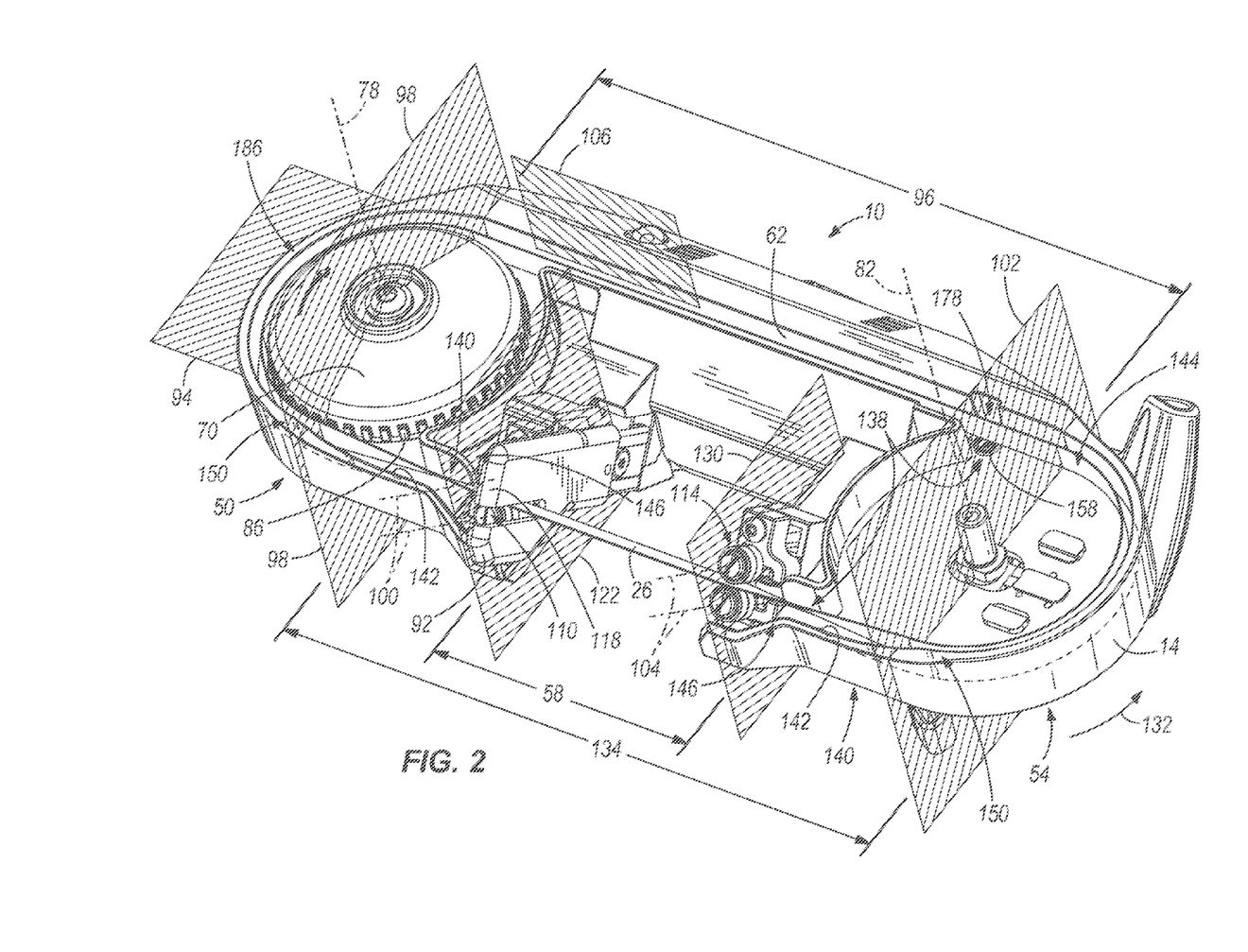
FIG. 2 is a bottom perspective view of the band saw of FIG. 1.
Figure 3A:
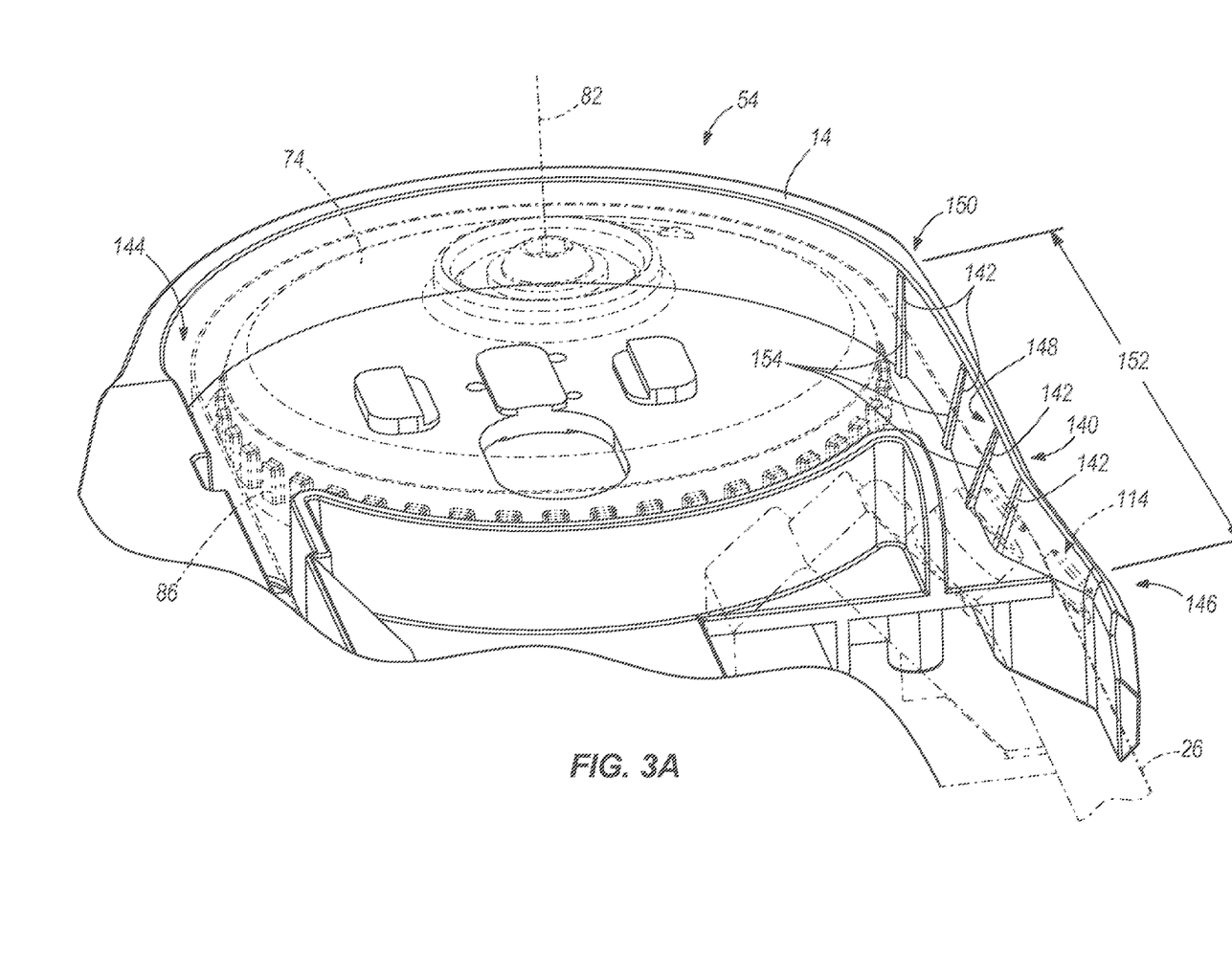
FIG. 3A is a bottom perspective view of a portion of the band saw of FIG. 2 including one embodiment of a blade installation mechanism.

As shown in FIGS. 2 and 3A, the band saw 10 generally includes a drive wheel pulley 70 (FIG. 2) and a driven wheel pulley 74 (shown in phantom in FIG. 3A). The drive wheel 70 rotates about a drive wheel axis 78 and is drivingly connected to the motor 18 via a drive train (not shown). The driven wheel 74 rotates about a driven wheel axis 82 and is rotatably supported by the housing 14. The driven wheel 74 is removed from FIGS. 2, 4 and 6 for ease of illustration. The drive wheel 70 is positioned in the first portion 50 of the housing 14, and the driven wheel 74 is positioned in the second portion 54 of the housing 14. A blade tire 86 is coupled to each of the peripheries of the drive wheel 70 and the driven wheel 74. Each blade tire 86 is a circular-shaped ring formed of a soft and/or flexible elastomeric material that is able to lock or adhere to the respective wheel 70, 74. The band saw blade 26 extends around the drive wheel 70 and the driven wheel 74 and grips the blade tires 86 and, as a result, motion from the drive wheel 70 is transmitted to the band saw blade 26 via the blade tires 86. The band saw 10 includes a blade tensioning mechanism 90 to adjustably provide appropriate tension on the band saw blade 26. The band saw 10 also includes a shoe 92 for positioning against the work piece.

The band saw 10 includes a tool plane 94 defined by an underside 186 of the band saw 10. The drive wheel 70 and the driven wheel 74 are positioned within and parallel to the tool plane 94. The axis of rotation of the drive wheel 78 defines a drive wheel plane 98 that is substantially perpendicular to the tool plane 94 and extends from the front 30 to the rear 34 of the band saw 10. Similarly, the axis of rotation of the driven wheel 82 defines a driven wheel plane 102 that is substantially perpendicular to the tool plane 94 and extends from the front 30 to the rear 34 of the band saw 10. A portion of the band saw blade 26 housed by the blade guard 62 in the rear 34 of the band saw 10 extends a length 96 substantially untwisted and unbent. This portion of the band saw blade 26 is positioned substantially perpendicular to the tool plane 94 and defines a blade plane 106.

A first guide roller set 110 and a second guide roller set 114 are disposed on each side of the cut zone 58 and are intended to engage opposing sides of the band saw blade 26. The first and second guide roller sets 110, 114 support the band saw blade 26 as the blade 26 enters and exits the cut zone 58. The cut zone 58 is defined by the distance between the shoe 92 and the second guide roller set 114.

The guide roller sets 110, 114 are positioned to guide the band saw blade 26 to twist a predetermined angle relative to the blade plane 106. In the illustrated embodiment, the first and second guide roller sets 110, 114 are positioned at an approximately 50-degree angle with respect to the blade plane 106 (i.e., 40-degree angle with respect to the tool plane 94). The first and second guide roller sets 110, 114 provide a twist to the saw blade 26, such that within the cut zone 58 the saw blade 26 is angled at a twist angle of approximately 50-degrees with respect to the blade plane 106. In further embodiments, the twist angle may be less than or greater than 50 degrees. The first guide roller set 110 defines a pair of central axes 100, one central axis belonging to each roller in the first guide roller set 110. The pair of central axes lie in a first guide roller plane 122, which is also perpendicular to the tool plane 94. Similarly, the second guide roller set 114 defines a pair of central axes 104, one central axis belonging to each roller in the second guide roller set 114. The pair of central axes 104 lie in a second guide roller plane 130, which is also perpendicular to the tool plane 94.

In operation, the band saw blade 26 rotates about the drive wheel 70 and the driven wheel 74 in a direction 132 (a counter-clockwise direction as viewed from the underside of the band saw 10 in FIG. 2). As the saw blade 26 crosses the drive wheel plane 98 and enters a twist zone 134 (defined between the drive wheel plane 98 and the driven wheel plane 102), the saw blade 26 begins to twist such that the saw blade 26 is approaching a the twist angle with respect to the blade plane 106 until the band saw blade 26 enters the first roller guide set 110 where the saw blade 26 has reached the twist angle, which is 50 degrees in the illustrated embodiment. The saw blade 26 remains at the twist angle as the saw blade 26 travels through the cut zone 58. The saw blade 26 is still at the twist angle until it crosses the second roller guide plane 130 where the saw blade 26 begins to "un-twist" to return to the substantially perpendicular position. The saw blade 26 has completed the "un-twist" as the band saw blade 26 crosses the driven wheel plane 102 and exits the twist zone 134. Outside of the twist zone 134, the saw blade 26 is positioned in the blade plane 106 which is substantially perpendicular to the tool plane 94.

With reference to FIGS. 2 and 3A, the band saw 10 includes one embodiment of a blade installation mechanism 140. Referring to FIG. 2, one blade installation mechanism 140 is located on the housing 14 at opposite ends of the cut zone 58. The blade installation mechanism 140 includes ribs 142 coupled to or projecting from an inner surface 148 of the first and second portions 50, 54 of the housing 14. The ribs 142 are used to install the band saw blade 26 in the band saw 10 and around the wheels 70, 74. The inner surface 148 of the housing 14 is angled variably and is non-perpendicular to the tool plane 94. The blade installation mechanism 140 helps achieve the proper twist angle of the saw blade 26 prior to engagement (i.e., during installation) of the saw blade 26 with the guide roller sets 110, 114. Generally, the ribs 142 help guide the band saw blade 26 into the guide roller sets 110, 114. The ribs 142 also prevent the band saw blade 26 from becoming snagged or stuck in an undesired location within the housing 14.

Each blade installation mechanism 140 has a first end 146, a second end 150 and a length 152 defined by the distance between the first and second ends 146, 150. The ribs 142 are spaced apart between the first and second ends 146, 150. Each rib 142 is coupled to the housing 14 proximate respective transition points of the band saw blade 26 from the twisted angle (i.e., the 50-degree angle of the saw blade 26) to the un-twisted angle of the band saw blade 26 that is perpendicular to the tool plane 94. The transition points are located within the twist zone 134 on opposing sides of the cut zone 58 and proximate the guide roller sets 110, 114. In the illustrated embodiment, the ribs 142 are integrally formed with the housing 14. In some embodiments, the ribs 142 are removably coupled to the housing 14. The first end 146 of the ribs 142 is positioned proximate to the cut zone 58 and the second end 150 of the ribs 142 is positioned proximate the drive wheel plane 98 and the driven wheel plane 102 of the respective wheel 70, 74.

In the illustrated embodiment, four ribs 142 are employed. In other embodiments, one, two, three or more than four ribs may be employed. In still other embodiments, zero ribs may be employed and the blade installation mechanism 140 may consist of the inner surface 148 of the housing 14, which follows a similar range of angles, or twist, as the ribs 142. The inner surface 148 of the housing 14 is ramped or sloped proximate the first end 146 and transitions to being substantially perpendicular to the tool plane 94 proximate the second end 150.

Each rib 142 has a ramped or sloped blade surface 154 facing the drive wheel 70 or driven wheel 74. Each blade surface 154 is angled with respect to the blade plane 106 or the tool plane 94 according to an angle and/or position of a twisting and/or un-twisting of the band saw blade 26 adjacent the ribs 142. For example, the blade surface 154 is at approximately a 50-degree angle (parallel to the twisted saw blade 26) proximate the first end 146 and is approximately a 10-degree angle with respect to the blade plane 106 proximate the second end 150 (or at an 80-degree angle with respect to the tool plane 94), each rib 142 and blade surface 154 therebetween having an angle between approximately 10 and 50 degrees. The blade surfaces 154 generally follow or taper the twisting and/or un-twisting action of the saw blade 26. In the illustrated embodiment, the blade surfaces 154 taper at a slower rate than the twisting and/or un-twisting of the saw blade 26 such that when the saw blade 26 is released, the saw blade 26 is able to slide across the blade guides 142 thereby preventing the saw blade 26 from digging into or becoming caught within the housing 14.

Figure 3B:
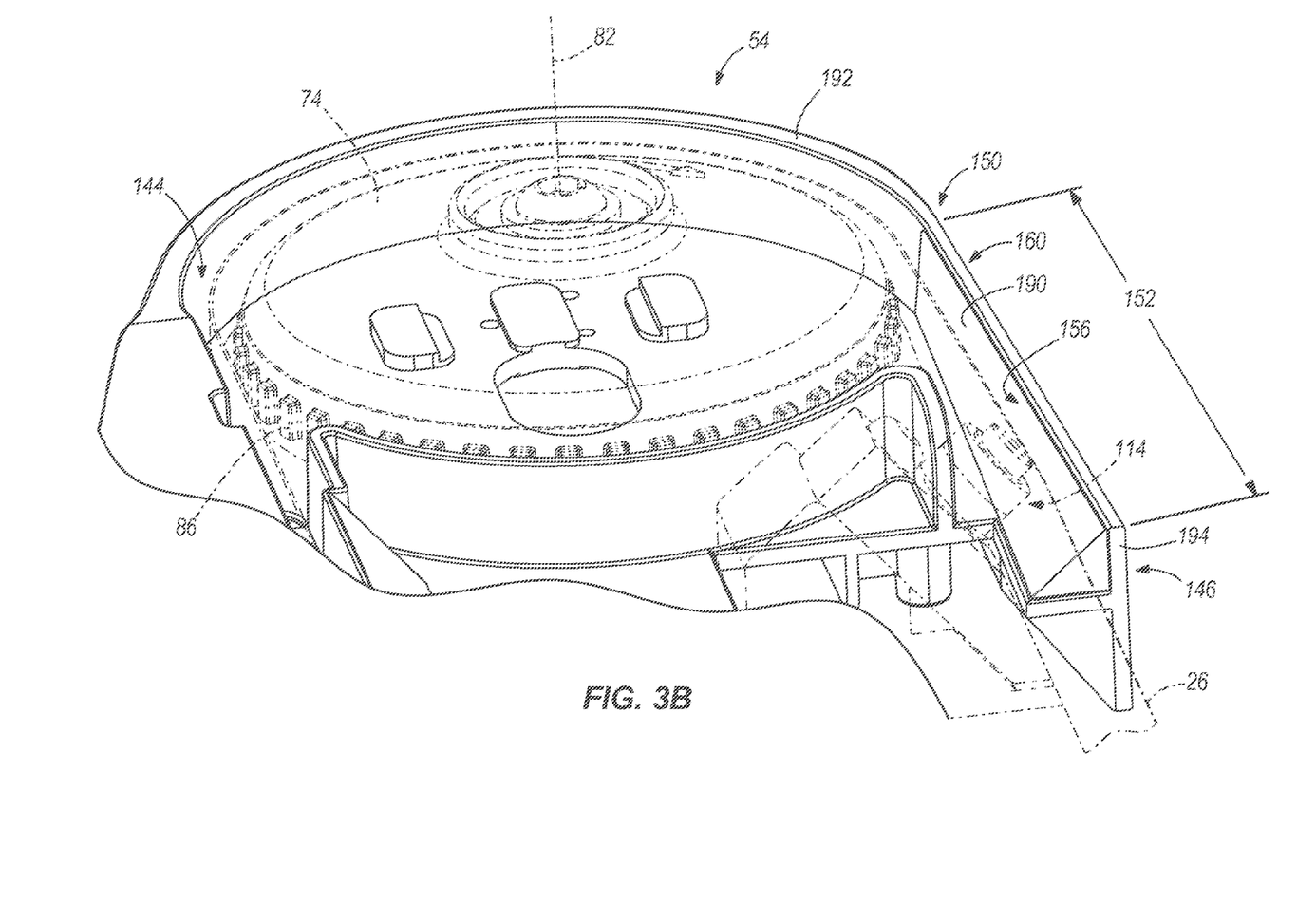
FIG. 3B is a bottom perspective view of a portion of a band saw including another embodiment of a blade installation mechanism.

FIG. 3B illustrates a blade installation mechanism 160 according to another embodiment of the invention; therefore, features that are similar to the features of the band saw 10 of FIGS. 1-3A and 4-7 are given the same reference numerals. The blade installation mechanism 160 includes a pair of blade guides 190 coupled to a housing 192 of the band saw 10 and is used to install the band saw blade 26. Each blade guide 190 is positioned on the housing 192 at opposite ends of the cut zone 58. In FIG. 3B, the blade guide 190 located adjacent the driven wheel 74 and the guide roller set 114 is illustrated In the illustrated embodiment, the housing 192 has a substantially right-angle, i.e., the housing 192 includes a blade guard wall 194 that is substantially perpendicular to the tool plane 94, or substantially parallel to the blade plane 106. The blade installation mechanism 160 provides a blade surface 156 to achieve the proper twist angle of the saw blade 26 prior to engagement (i.e., during installation) of the saw blade 26 with the guide roller sets 110, 114. Generally, the blade guides 190 help guide the band saw blade 26 into the guide roller sets 110, 114. The blade guides 190 also prevent the band saw blade 26 from becoming snagged or stuck in an undesired location within the housing 192.

Each blade guide 190 includes the first end 146, the second end 150 and the length 152 defined by the distance between the first and second ends 146, 150. The band saw blade 26 is able to slide across the blade guides 190 and into and/or out of engagement with the guide roller sets 110, 114. In some constructions, each blade surface 156 of the blade guides 190 is generally parallel, at the first end 146, to the surfaces of the guide roller sets 110, 114 that engages the opposing sides of the band saw blade 26 (i.e., a 50-degree angle). The blade surface 156 of each blade guide 190 varies along the length of the blade guide 190 according to the angle and/or position of the twisting and/or un-twisting of the band saw blade 26. For example, the blade surface 156 is at approximately a 50-degree angle (parallel to the twisted saw blade 26) proximate the first end 146 and tapers to being approximately parallel (i.e., zero-degrees) with respect to the blade plane 106 (or the blade guard wall 194) proximate the second end 150. In other embodiments, the blade surface 156 may taper to a 10-degree angle with respect to the blade plane 106 proximate the second end 150, or the like. The blade surface 156 generally follows or tapers the twisting and/or un-twisting action of the saw blade 26. In the illustrated embodiment, the blade surface 156 tapers at a slower rate than the twisting and/or un-twisting of the saw blade 26 such that when the saw blade 26 is released, the saw blade 26 is able to slide across the blade guides 190 thereby preventing the saw blade 26 from digging into or becoming caught within the housing 192.

Each blade guide 190 is coupled to the housing 192 proximate the respective transition points of the band saw blade 26 from the twisted (i.e., the 50-degree angle of the saw blade 26) to the un-twisted angle (of the band saw blade 26) that is substantially perpendicular to the tool plane 94. The transition points are located within the twist zone 134 on opposing sides of the cut zone 58 and proximate the guide roller sets 110, 114. In some embodiments, the blade guides 190 are removably coupled to the housing 192. In other embodiments, the blade guides 190 are integrally formed with the housing 192. The first end 146 of the blade guide 190 is positioned in the cut zone 58 and the second end 150 of the blade guide 190 is positioned proximate the drive wheel plane 98 and the driven wheel plane 102 of the respective wheel 70, 74.

With reference to both illustrated embodiments, the blade guides 142, 190 of the blade installation mechanism 140, 160 are used to install the band saw blade 26 into the housing 14, 192 and, in some cases, to remove the band saw blade 26 from the housing 14, 192. To install the band saw blade 26 into the guide roller sets 110, 114, and ultimately around the drive and driven wheels 70, 74, the user sets the band saw blade 26 on one or both of the blade guides 142, 190. The user slides the band saw blade 26 across the blade surface 154, 156 of the blade guides 142, 190. The blade guides 142, 190 lead and/or guide the band saw blade 26 into engagement with the guide roller sets 110, 114. The user may engage the band saw blade 26 into the guide roller sets 110, 114 one at a time or at the same time.

After the band saw blade 26 is inserted into the guide roller sets 110, 114, the user pulls the band saw blade 26 around the drive wheel 70 and the driven wheel 74. In some embodiments, the user may place the band saw blade 26 around the drive wheel 70 and the driven wheel 74, and then use the blade installation mechanism 140, 160 (i.e., the blade guides 142, 190) to engage or install the band saw blade 26 into the guide roller sets 110, 114. In the illustrated embodiment, the band saw blade 26 does not slide across the blade guide 142, 190 during operation and instead is spaced away from the blade guide 142, 190 as shown in FIG. 2. In further embodiments, during operation of the band saw 10, the band saw blade 26 may touch or slide across the blade guides 142, 190.

With reference to FIGS. 1-2 and 4-7, the band saw 10 further includes a blade removal mechanism 138 having a pad 158, and an actuator 162 and pin 164 coupled to the pad 158. The blade removal mechanism 138 eases removal of the band saw blade 26 from the drive and driven wheels 70, 74 and the guide roller sets 110, 114.

Figure 4:
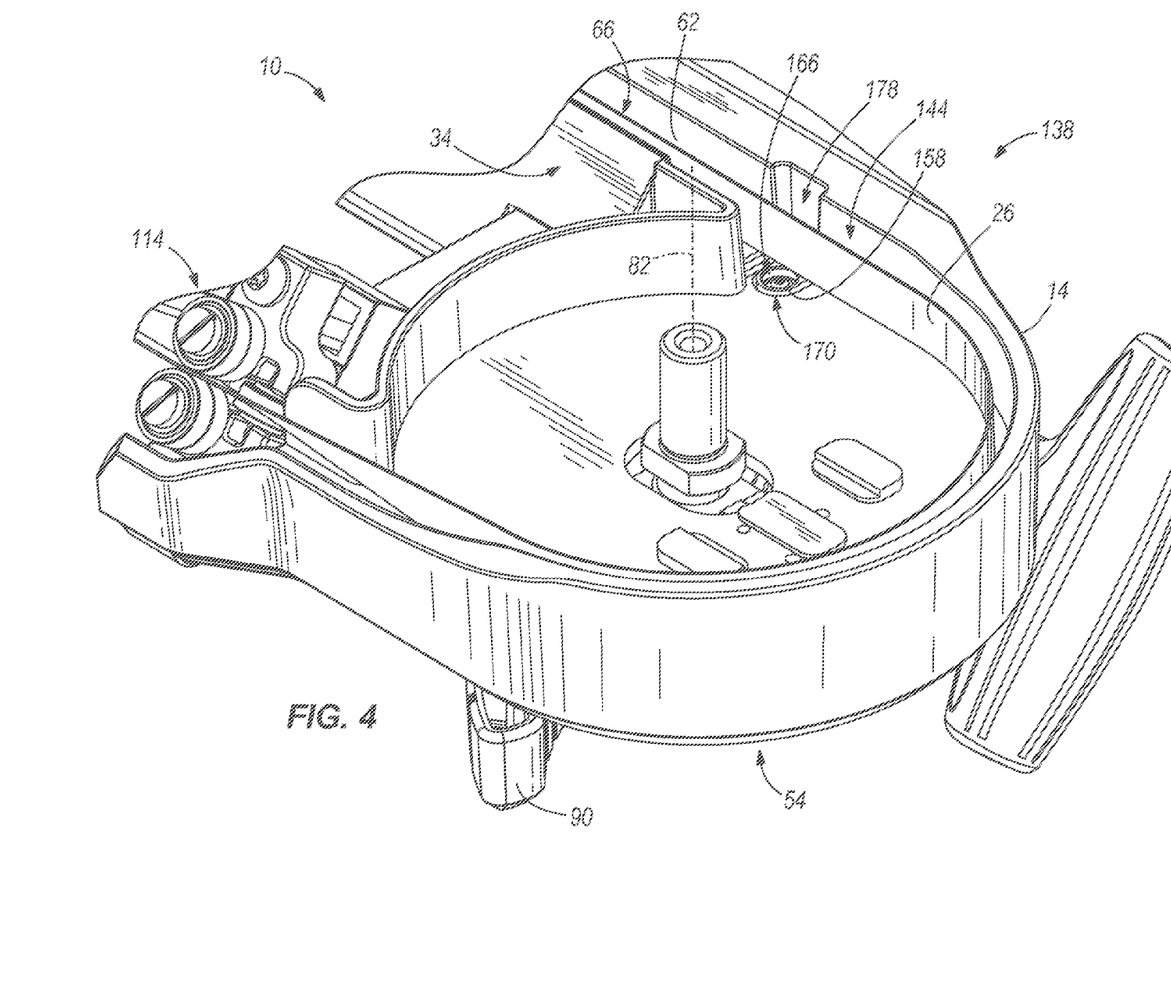
FIG. 4 is a bottom perspective view of a portion of the band saw of FIG. 2 showing a pad of the blade removal mechanism in a non-actuated condition.
Figure 6:
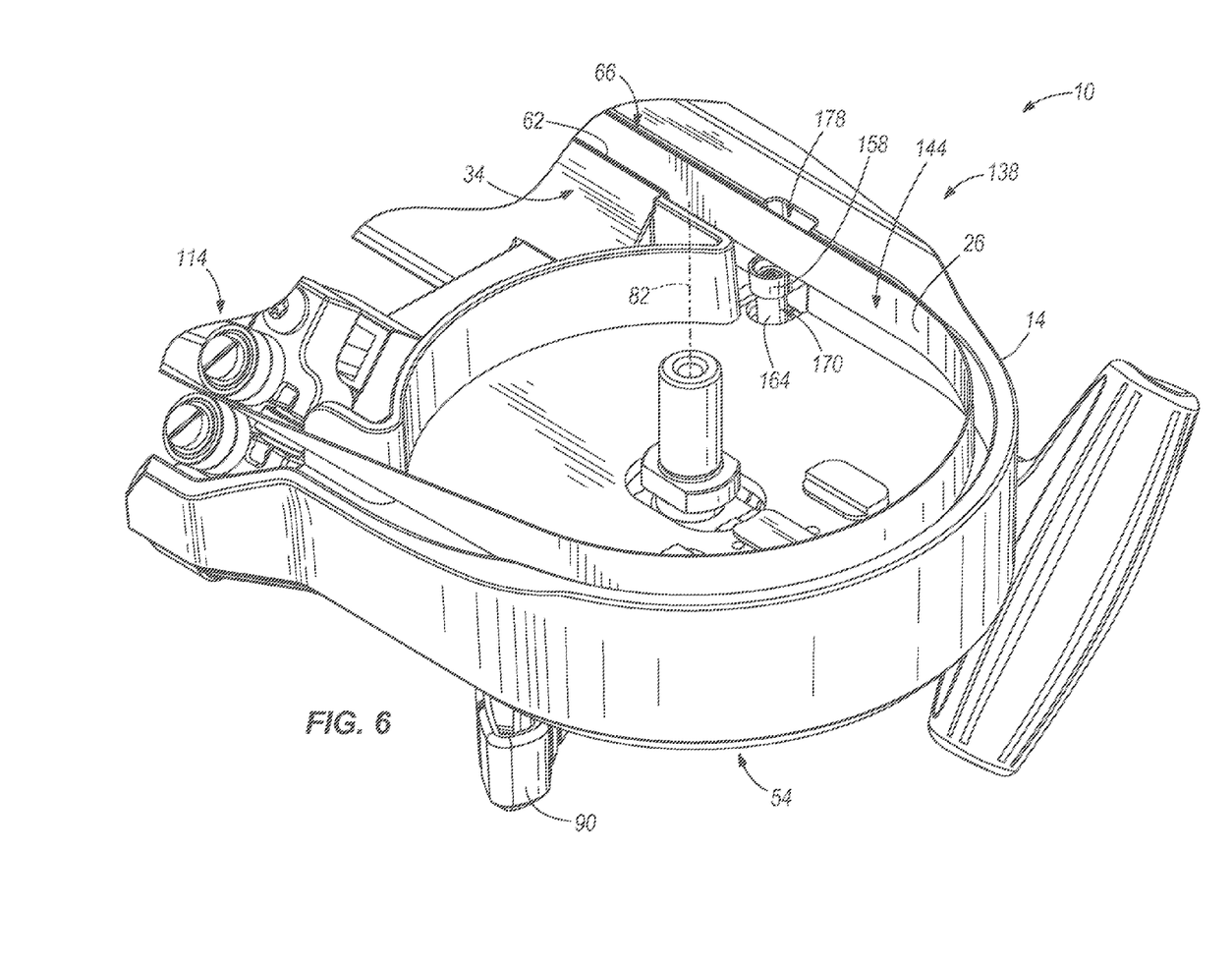
FIG. 6 is a bottom perspective view of a portion of the band saw of FIG. 2 showing the pad of the blade removal mechanism in an actuated condition.

As shown in FIGS. 2, 4 and 6, the pad 158 includes a first surface 166 and a second surface 170 (FIG. 6) opposite the first surface 166. The first surface 166 engages and moves the band saw blade 26 parallel to the blade plane 106 upon actuation of the actuator 162. In the illustrated embodiment, the pad 158 has cylindrical and block shaped portions forming a U-shaped block; however in other embodiments, the pad 158 is formed as any shape that can engage and move the band saw blade 26.

The pin 164 is coupled to the second surface 170 of the pad 158 and transmits movement to the pad 158. The actuator 162 is coupled to the pin 164 at an end opposite the pad 158 such that movement imparted on the actuator 162 is transmitted to the pin 164 and finally to the pad 158. In the illustrated embodiment, the actuator 162 is a flat U-shaped piece; although in other embodiments, the actuator 162 may be various other shapes. The pin 164 is a cylindrical shaped pin; although in other embodiments, the pin 164 may be various other shapes.

Figure 5:
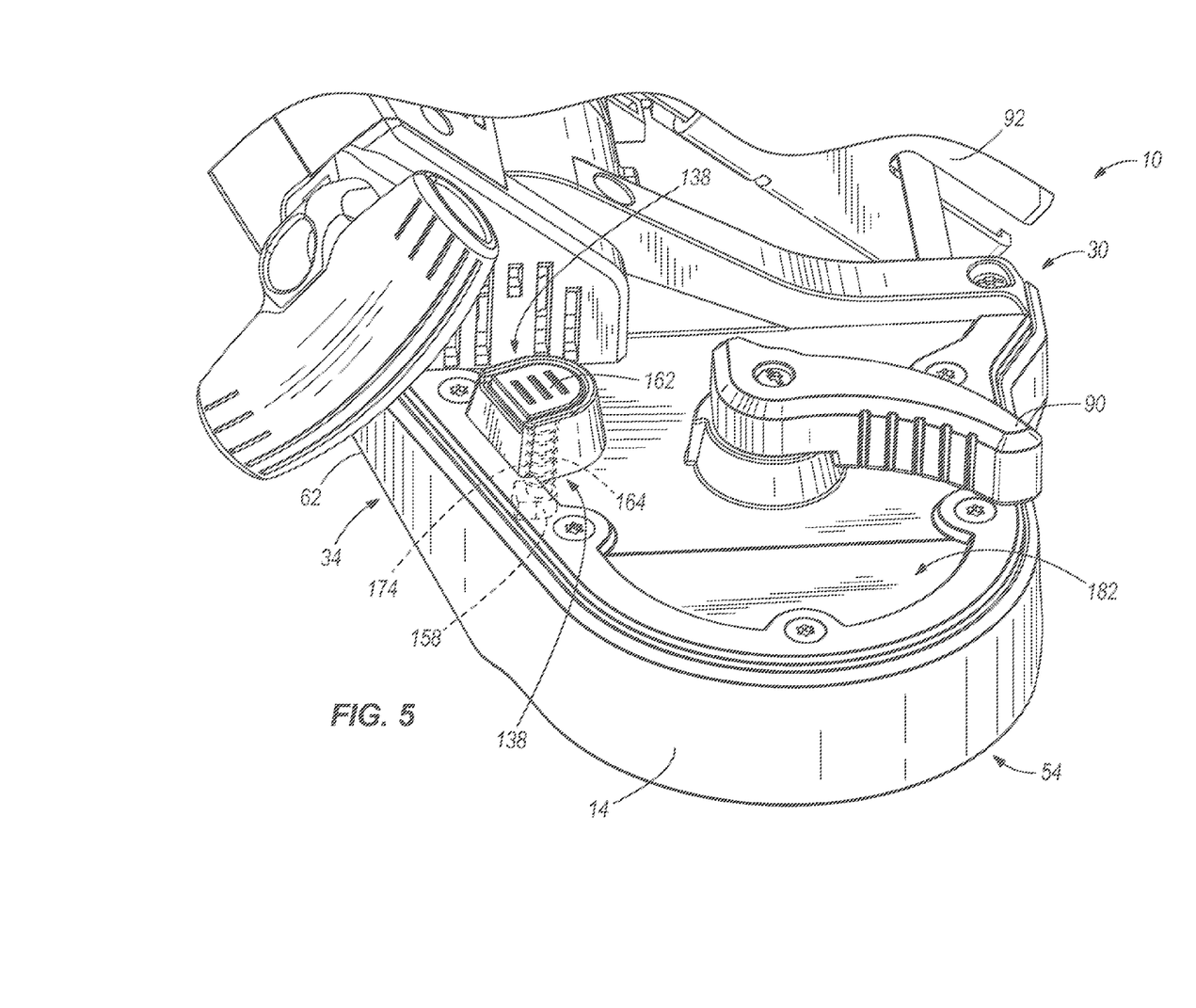
FIG. 5 is a top perspective view of a portion of the band saw of FIG. 1 showing the blade removal mechanism in the non-actuated condition.
Figure 7:
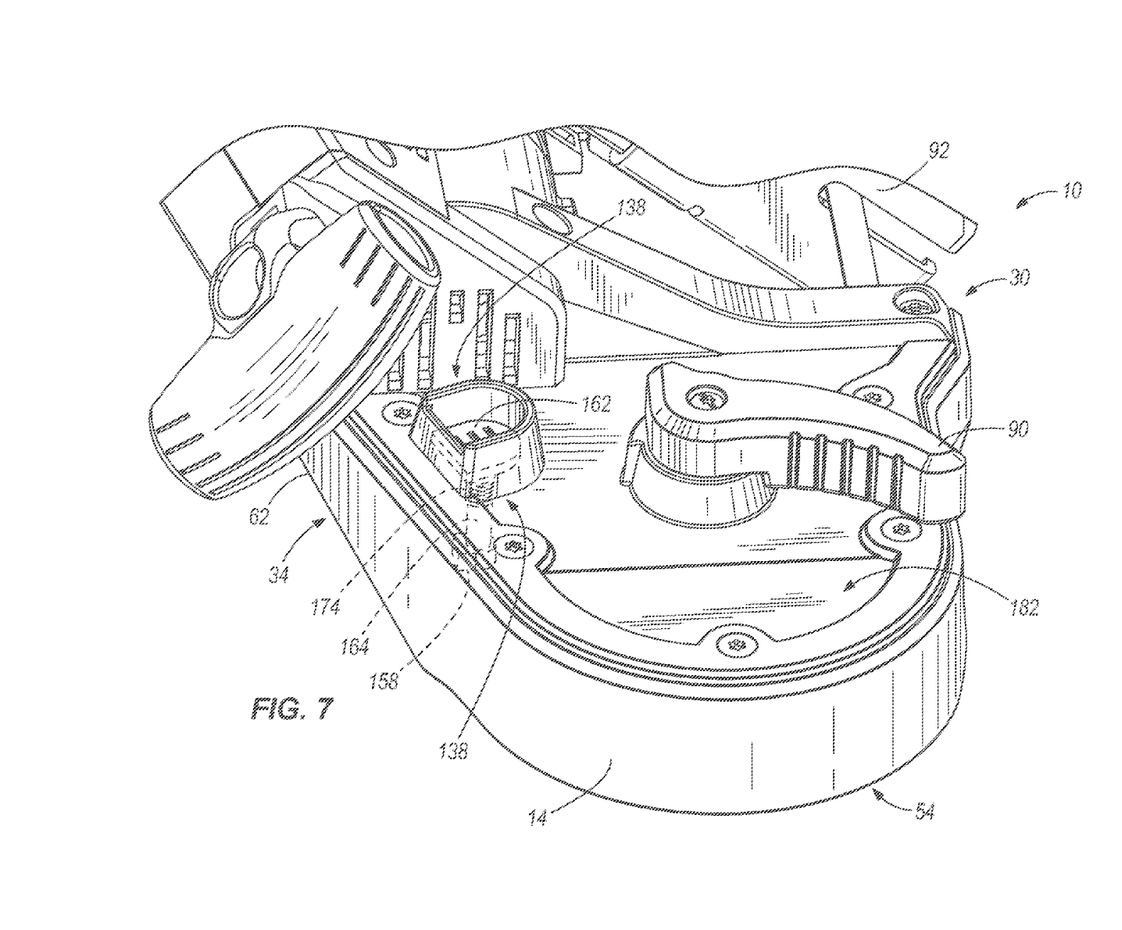
FIG. 7 is a top perspective view of a portion of the band saw of FIG. 1 showing the blade removal mechanism in the actuated condition.

As shown in FIGS. 5 and 7, a biasing member 174 is positioned around the pin 164. The biasing member 174 applies a biasing force on the actuator 162, and thereby the pad 158, to bias the blade removal mechanism 138 to a neutral or non-actuated condition. In the illustrated embodiment, the biasing member 174 is a compression spring, although in other embodiments, other types of biasing members may be used such that the blade removal mechanism 138 is biased to the neutral condition and away from the band saw blade 26.

FIGS. 4 and 5 illustrate the blade removal mechanism 138 in the non-actuated or neutral condition. In the neutral condition, the spring biasing member 174 biases the pad 158 away from and out of a path of the band saw blade 26 such that when the band saw 10 is operating, the pad 158 does not interfere with the band saw blade 26. FIGS. 6 and 7 illustrate the blade removal mechanism 138 in an actuated condition. In the actuated condition, a user depresses the actuator 162 such that the first side 166 of the pad 158 presses against the band saw blade 26 to push the band saw blade 26 away from and out of the housing 14.

In the illustrated embodiment, the pad 158, the pin 164 and the actuator 162 are coupled to and positioned at the rear 34 of the housing 14. The pad 158 is positioned along the blade plane 106 between the housing 14 and the band saw blade 26, or between the housing 14 and the intended location of the band saw blade 26 (when the band saw blade 26 is removed), e.g., adjacent a blade receiving space 144. In other embodiments, the pad 158 is positioned anywhere along the band saw blade 26 that is not tensioned against the drive and driven wheels 70, 74. In still other embodiments, the pad 158 is positioned in the twist zone 134 of the band saw blade 26 and within the housing 14. The pad 158 slides within a channel 178 formed in the housing 14, which guides movement of the pad 158 along a path that is parallel to the blade plane 106.

The pin 164 extends through the housing 14 to a top side 182 of the housing 14 (FIGS. 5 and 7) such that a portion of the actuator 162 extends above or beyond the housing 14. The actuator 162 is accessible for a user to manually apply a force to the actuator 162 against the biasing force of the biasing member 174. The actuator 162 and thus the pin 164 are depressed to directly move the pad 158 and apply force to the band saw blade 26. In some embodiments, the pad 158, the pin 164 and the actuator 162 are formed as a single piece. In other embodiments, the force applied to the actuator 162 is automated. In other embodiments, the actuator 162 is positioned anywhere on the housing 14 and the force applied thereon is conveyed to the pad 158 either directly or indirectly, e.g., by way of intermediate linkages.

The blade removal mechanism 138 is used to push and/or eject the band saw blade 26 from the housing 14. As shown in FIG. 6, when the blade removal mechanism 138 is in the actuated condition, the pad 158 pushes the band saw blade 26 to partially remove or expose the band saw blade 26 from the housing 14. In other embodiments, the pad 158 may completely remove the band saw blade 26 from the housing 14. To push and/or eject the band saw blade 26, the user presses the actuator 162 toward the housing 14 against the biasing force of the biasing member 174. The actuator 162, the pin 164 and the pad 158 coupled thereto move from the non-actuated condition (FIGS. 4 and 5) to the actuated condition (FIGS. 6 and 7) in response to the force applied by the user. The pad 158 contacts the band saw blade 26 and pushes the band saw blade 26 partially away from the housing 14 in a direction approximately perpendicular to the tool plane 94. With the band saw blade 26 partially removed from the housing 14, the user grasps the exposed portion of the band saw blade 26 and pulls the band saw blade 26 completely from the housing 14, from around the wheels 70, 74, and from the guide roller sets 110, 114.

Although particular constructions embodying independent aspects of the present invention have been shown and described, other alternative constructions will become apparent to those skilled in the art and are within the intended scope of the independent aspects of the present invention.

What is claimed is:

1. A band saw comprising: a housing defining a blade receiving space; a band saw blade; and a blade removal mechanism, the blade removal mechanism comprising a first member positioned adjacent the blade receiving space, an actuator coupled to the first member for moving the first member between a first position where the first member is spaced from the blade and a second position where the first member engages and moves the blade to an elevated position where the blade can be removed, and a biasing member for biasing the first member to the first position.

2. The band saw of claim 1, wherein the first member is a pad.

3. The band saw of claim 1, further comprising a pin including a first end coupled to the actuator and a second end coupled to the pad allowing the actuator to be coupled to the first member.

4. The band saw of claim 3, wherein the pin is substantially cylindrical.

5. The band saw of claim 3, wherein the movement imparted on the actuator is transmitted to the pad through the pin.

6. The band saw of claim 5, wherein the biasing member is positioned about the pin for biasing the actuator to the first position.

7. The band saw of claim 5, wherein the first member includes a first surface and a second surface, the first surface engageable with the band saw blade when the first member is in the second position, and the second surface is coupled to the pin.

8. The band saw of claim 1, wherein the first member slideably moves between the first position and the second position.

9. The band saw of claim 1, wherein the first member is generally U-shaped.

10. The band saw of claim 1, wherein the actuator is generally U-shaped.

11. A band saw comprising: a housing; a motor supported by the housing; a first wheel drivingly connected to the motor; a second wheel rotatably supported by the housing; a band saw blade to cut a work piece, the blade extending around the first and second wheels, wherein the housing defines a blade-receiving space for receiving the blade therein; and a blade removal mechanism, the blade removal mechanism comprising a first member positioned adjacent the blade receiving space, an actuator coupled to the first member for moving the first member between a first position where the first member is spaced from the blade and a second position where the first member engages and moves the blade to an elevated position where the blade can be removed, and a biasing member for biasing the first member to the first position.

12. The band saw of claim 11, wherein the housing includes a first surface defining the blade-receiving space and a second surface opposite the first surface, and further wherein the actuator is positioned at or above the second surface of the housing such that the actuator is accessible for a user to manually apply a force to the actuator to create the movement.

13. The band saw of claim 11, further comprising a pin extending through the housing between the first member and the actuator, the pin including a first end coupled to the actuator and a second end coupled allowing the actuator to be couple to the first member.

14. The band saw of claim 13, wherein the movement imparted on the actuator is transmitted to the first member through the pin.

15. The band saw of claim 13, wherein the biasing member is positioned about the pin for biasing the first member to the first position.

16. The band saw of claim 13, wherein the pad includes a first surface and a second surface, the first surface engageable with the blade when the blade removal mechanism is in the second position, and the second surface coupled to the pin.

17. The band saw of claim 11, further comprising a channel formed in the housing proximate the blade-receiving space, wherein the first member is slidably received in the channel as the first member moves between the first position and the second position.

18. The band saw of claim 11, wherein the first member comprises a pad.

19. The band saw of claim 18, wherein the pad is generally U-shaped.

20. The band saw of claim 11, wherein the actuator is generally U-shaped.

\* \* \* \* \*

UNITED STATES PATENT AND TRADEMARK OFFICE
CERTIFICATE OF CORRECTION

PATENT NO.       : 8,567,295 B2  
APPLICATION NO.  : 13/056754  
DATED            : October 29, 2013  
INVENTOR(S)      : Wackwitz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Fifteenth Day of September, 2015

Michelle K. Lee
*Director of the United States Patent and Trademark Office*